INVENTORS.
STEN AUGUST HENSTRÖM
SVEN ERIK BERGE
BY
ATTORNEYS

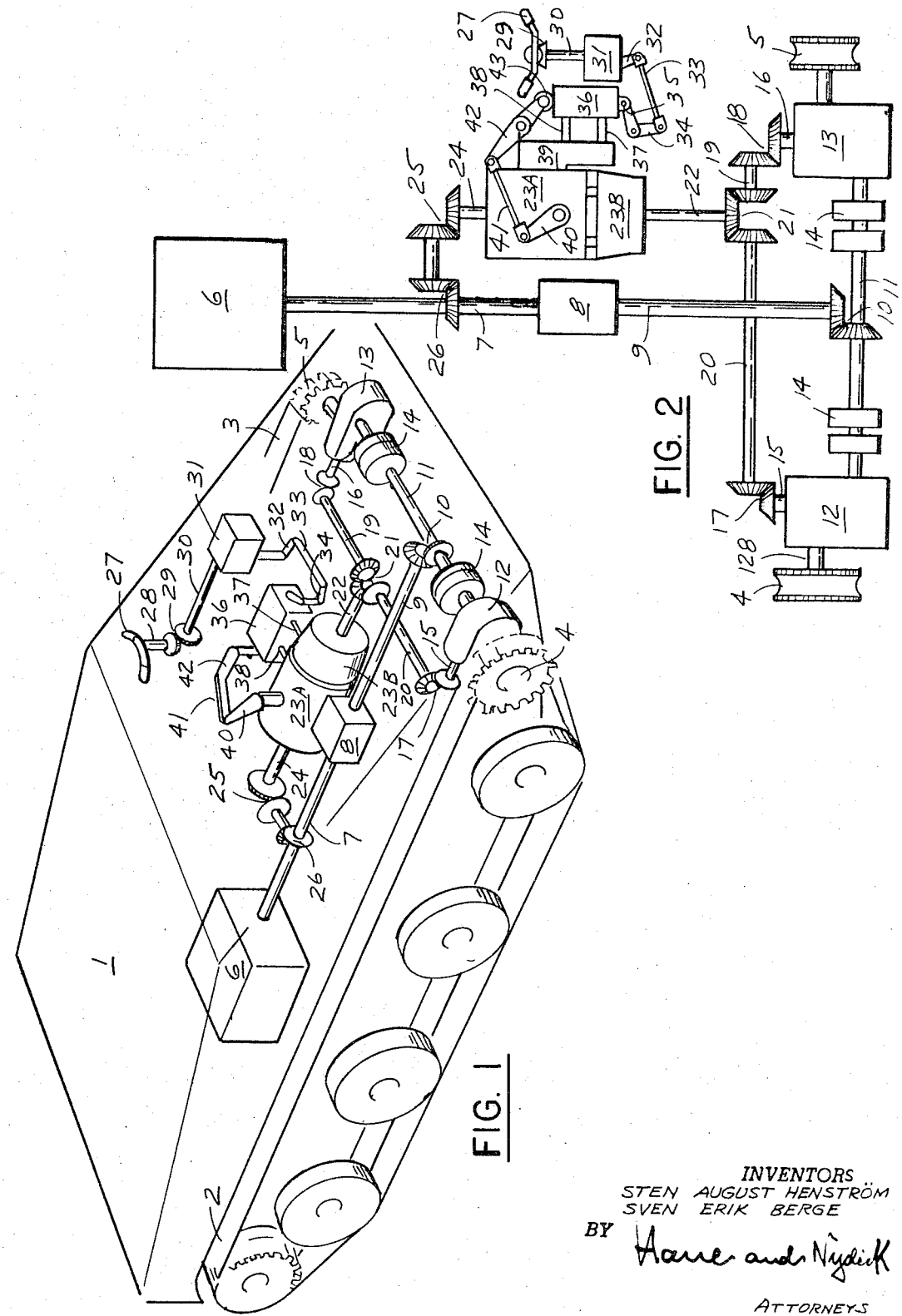

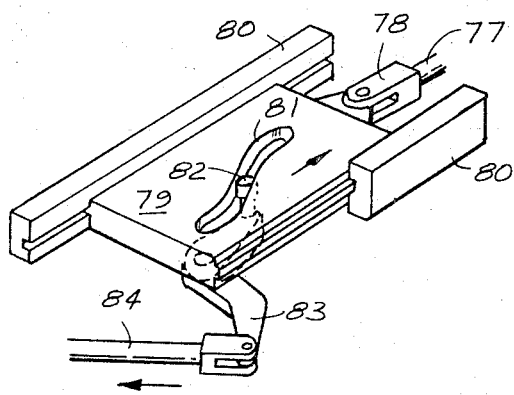
FIG. 7
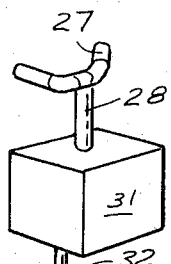
FIG. 8
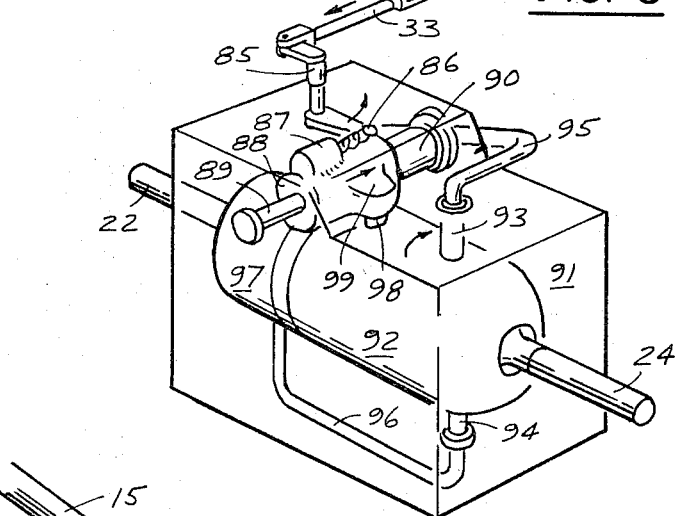
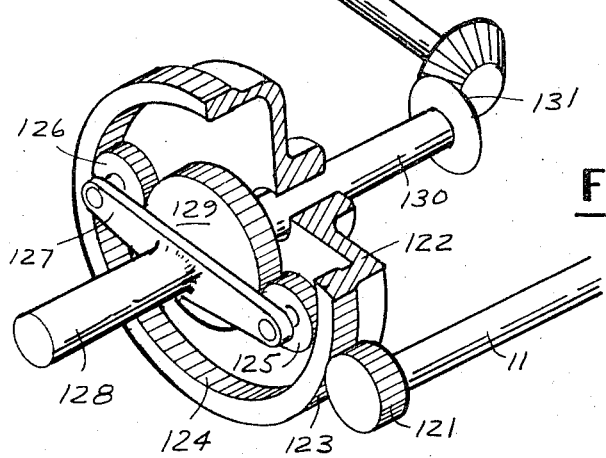
FIG. 11
INVENTORS
STEN AUGUST HENSTRÖM
SVEN ERIK BERGE
BY 
ATTORNEYS Feb. 20, 1968  S. A. HENSTROM ET AL  3,369,419
CONTROL DEVICE FOR TRACK-LAYING VEHICLES
Filed May 3, 1965  5 Sheets-Sheet 5

United States Patent Office 3,369,419
Patented Feb. 20, 1968

3,369,419
CONTROL DEVICE FOR TRACK-LAYING
VEHICLES
Sten August Henstrom, Bofors, and Sven Erik Berge,
Stockholm, Sweden, assignors to Aktiebolaget Bofors,
Bofors, Sweden, a corporation of Sweden
Filed May 3, 1965, Ser. No. 452,733
Claims priority, application Sweden, May 6, 1964,
5,620/64
6 Claims. (Cl. 74—720.5)

ABSTRACT OF THE DISCLOSURE

A device for directional control of a track-laying vehicle particularly a combat vehicle which provides for superimposing a driving force to the power driven wheels of the vehicle so that the wheels on one side of the vehicle are driven at a rotational speed different from that of the wheels on the other side of the vehicle, or so that the wheels on one side are driven forwardly and the wheels on other side are driven in reverse to effect a rapid and accurate turning of the vehicle. The device also permits superimposition of directional forces while the vehicle is at a standstill for the purpose of aiming a gun mounted on the vehicle.

---

The present invention relates to a device for steering track-laying vehicles, particularly vehicles of this kind which travel at a high speed. The invention is particularly well suited for combat vehicles, especially those on which the armament is partly or entirely aimed in traverse by turning the entire vehicle.

It is an object of the invention to provide a steering device which has a great maneuverability and good functioning certainty, and this is of extremely great importance for high-speed combat vehicles and particularly for those of the above-mentioned type, the armament of which is partly or entirely aimed in traverse by turning the entire vehicle. By means of the device according to the present invention, it has become possible to change the course of the vehicle with good precision and very rapidly. The steering function can also be utilized when the vehicle is stationary, and this is, of course particularly valuable for the aiming in traverse with the entire vehicle, as mentioned above.

A device for steering of track-laying vehicles according to the present invention is characterized in that in the shaft system which drives the driving wheels which are required for driving the tracks, gears are arranged immediately in front of each driving wheel, to which gears, in addition to the input movement which is fed via the ordinary driving shaft system, a further input movement can be fed, which through overriding can increase or decrease the resulting movement of the driving wheels. The additional input movement to the gear may be fed via a shaft system with a double bevel gear in such a way that one of the driving wheels is given an increased speed and the other a decreased speed. The further input movement to the gear may also be fed via a continuously variable gear. This gear is appropriately of a hydrostatic type, in which the output movement is determined by the position of a tiltable member comprised in the pump part of the gear. The position of this member is controlled by a servo-motor piston, the position of which, in turn, is determined by the setting of a control device which directs the steering. The servo-motor piston may be designed so that the surface facing one of the working chambers is considerably smaller than the one facing the other working chamber. The working chamber facing the smaller surface is permanently in contact with the pressure side of a hydraulic system belonging to the device, and the pressure in the other working chamber is regulated so that the movement of the servo-motor piston strives to copy the movement of the control device. The pressure in the working chamber facing the larger surface of the servo-motor piston may be controlled by a valve built into a valve housing, a valve sleeve which can be displaced in the valve housing, and a valve body which can be displaced in the lining. The valve housing is provided with three adjacent ring-shaped grooves, of which the center one is connected with the last mentioned working chamber and the other two with the pressure and outlet sides, respectively, of the hydraulic system. The valve sleeve is provided with three recesses coacting with the three ring-shaped grooves, and the valve body with a recess which nearly corresponds to the distance between the two outermost recesses of the valve sleeve. The valve body is guided by an element regulated by the control member, and the valve sleeve by an element connected to the deflection of the pump part of the hydraulic speed gear. The controls of the regulating piston and the valve sleeve are balanced in such a way that when the control member is in a neutral position, the pressure in the last-mentioned working chamber has such a value that the servo-motor piston is in equilibrium, and will remain stationary. The system which transmits impulses from the steering-directing control member may contain a gear transmission so that when steering within the range of the nearest neutral position, a certain deflection of the control member has a smaller final steering effect than the corresponding deflection within the entire range. The steering-directing effect may be obtained by turning, and this is transmitted via a linkage in which a movable disc is included, with a curved steering groove and a journal running in the groove. The curved steering groove is designed in such a way that a certain turning of the control member within the angular range nearest the neutral position of the control member gives a smaller output movement of the linkage than an equally great movement of the control member within the ranges farther away from the neutral position of the control member. The gears arranged immediately in front of the driving wheels may have the form of planetary gears.

The invention will now be described in more detail with reference to the accompanying drawing, in which:

FIG. 1 shows schematically, in perspective, a track-laying vehicle provided with a steering device according to the present invention;

FIG. 2 also shows schematically the steering device shown in FIG. 1;

FIG. 7 shows a modification of the gearing comprised in the steering system;

FIGS. 8, 9 and 10 show another modification of the continuously variable gear as well as the servo-motor and valve which controls this gear; and FIG. 11 shows schematically and in perspective, partly cut away, the gearings placed immediately in front of the driving wheels.

Figure 4:
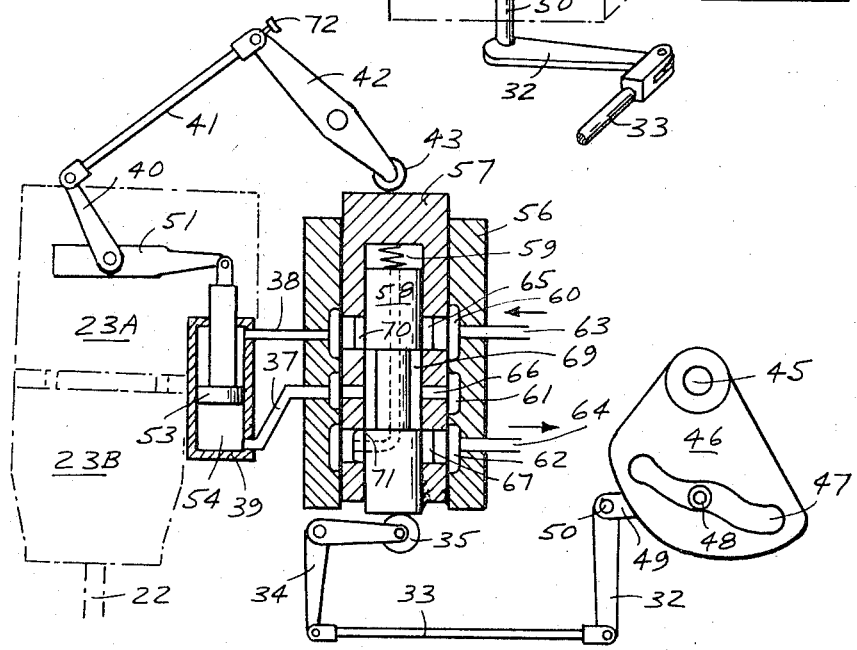
FIG. 4 shows schematically how the steering impulse can be transmitted to a continuously variable gear.

A schematically indicated track-laying vehicle 1, FIG. 1, is provided with two driving tracks 2 and 3 which are driven by driving wheels 4 and 5. The driving source for the track-laying vehicle 1 is a motor 6, such as a diesel motor. From this motor 6, the shaft 7 leads to a gear box 8, and the transmission continues via a shaft 9 to a bevel gear 10 which drives a shaft 11 to which two gears 12 and 13 are connected. Two brakes 14 are placed on shaft 11. In addition to the common input shaft 11, the two gears 12 and 13 have further input driving shafts 15 and 16. The gear boxes 12 and 13 are designed in such a way that, in addition to the input movement which is fed via the shaft 11, further movements can be fed which through overriding via shafts 15 and 16 give the driving wheels 4 and 5 an increased or decreased speed, respectively, in relation to the speed which is obtained via the shaft 11 only. The two input shafts 15 and 16 to the gears 12 and 13 are connected to a double bevel gear 21, which through shaft 22 is connected with a continuously variable gear 23, via bevel gears 17 and 18 and shafts 19 and 20. The gear 23 may be of the hydrostatic type, and may be made with, for instance, a hydraulic pump part 23A and a hydraulic motor part 23B, in accordance with what is shown on pages 207–208 of "Servo-Mechanism Practice" by W. R. Ahrendt: New York, 1954. The pump part 23A of the continuously variable gear obtains its input movement via a shaft 24, which is connected to motor 6 over bevel gears 25 and 26 and the shaft 7. The capacity of the pump part 23A has continuously variable setting, and the quantity and direction of the hydraulic fluid depend upon the position of a tiltable box 51 (FIG. 4).

The steering-directing control member is shown as a control lever 27 which is rotatable together with a shaft 28. Turning of the control member 27 is transmitted via a bevel gear 29, a shaft 30, a gearing 31, a lever 32, a link 33 and an angular lever 34 to a roller 35 which, in turn, actuates a valve body 58 which can be displaced in a valve 36 (FIG. 4). The valve 36 is connected via pipes 37 and 38 to a servo-motor 39 which controls the position of a tiltable member 51 in the gear pump part 23A. Member 51 is fixed to a lever 40 which via a link 41 and a lever 42 actuates a guide roller 43. This guide roller, in turn, actuates valve sleeve 57 which can be displaced in the valve 36 (FIG. 4).

Figure 3:
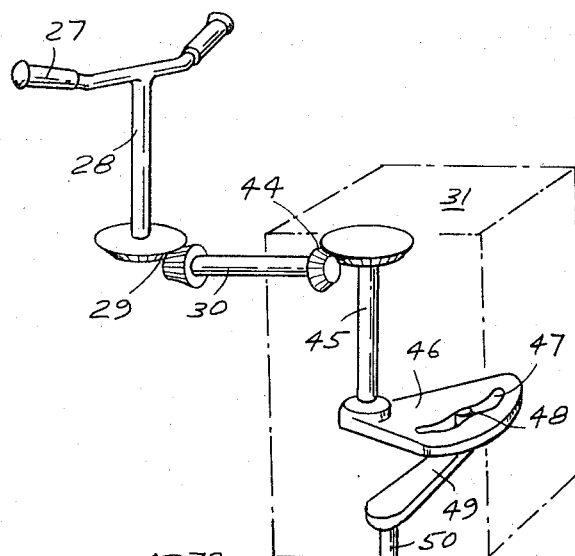
FIG. 3 shows the steering-directing control member and the linkage which transmits the steering impulse given from the control member.

As will be noted from FIG. 3, a turning of the control member 27 around the shaft 28 will be transmitted via the bevel gear 29 and the shaft 30 to a bevel gear 44 in the gearing 31. The movement of the bevel gear 44 is transmitted by means of a shaft 45 to a guide plate 46 which is provided with a curved guide groove 47 in which a journal 48 moves. The guide groove 47 has a shape such that when the control member 27 is turned to an angle within the range nearest the neutral position of this control member, the output movement via a lever 49 and a shaft 50 and lever 32 is considerably less than if the same turning through the same angle is made within ranges further away from the neutral position.

The movement of the angular lever 32 is transmitted via the link 33 and the angular lever 34 to the guide roller 35 (see FIG. 4), which is in contact with the free end of the valve body 58 which is arranged so that it can be displaced in the valve sleeve 57, which is cylindrical and can be displaced in the valve housing 56. The valve sleeve 57 is closed at one end, and between the inner part of this closed end and the end of the valve body 58 facing this end, a helical spring 59 is placed.

In the valve housing 56, there are three circular grooves 60, 61 and 62, adjacent to each other. The circular groove 60 is connected via a pipe 63 to the pressure side of a hydraulic system of the device and also to a pipe 38 leading to a working chamber 55 of the servo-motor 39. The middle ring-shaped groove 61 is connected via the pipe 37 to a working chamber 54 of the servo-motor 39, and the third ring-shaped groove 62 is connected via a pipe 64 to the outlet side of the hydraulic system.

The valve sleeve 57 is provided with three recesses 65, 66 and 67, which are entirely, and with a certain displacement margin, in registry with ring-shaped grooves 60, 61 and 62. At the inner cylindrical surface of the valve sleeve 54, the recesses 65 and 67 overlie ring-shaped grooves 74 and 75. In the middle part 68 of the valve body 58, there is a recess 69. This recess 69 is of such a size that the edges 70 and 71 formed by recess 69, when the valve 36 is in its rest position, coincide with the parts nearest each other of the ring-shaped grooves 74 and 75. The valve body 58 has a recess 76 whereby the space in which the helical spring 59 is located is connected with the outlet 64 via 75, 67 and 62.

The tiltable member 51 of the gear pump part 23A, which determines the pump capacity and, accordingly, also the output movement from the motor part 23B of the gear, is connected with a piston 53 via a piston rod 52. This piston 53 is arranged so that it can be displaced in the valve housing for servo-motor 39. As the piston rod 52 has a comparatively large diameter, the working chamber 55 which surrounds the piston rod 52 has a considerably smaller free surface facing the piston 53 than the working chamber 54 on the other side of the piston 53.

A tilting movement of member 51 will be transmitted via lever 40 fixed to the member 51, link 41 and two-armed lever 42 to guide roller 43. The guide roller 43 rests against the closed end of the valve sleeve 57, and thereby controls the position of the valve sleeve. The control movements of the regulating piston 57 and the valve sleeve 58 obtained by the rollers 35 and 43 can be adjusted by means of a setting screw 72. This adjustment can be made in such a way that the member 51 will be in a neutral position at the same time as the control member 27 is in a neutral position.

When the displacements of the valve body 58 and the valve sleeve 57, as obtained by the guide rollers 35 and 43, have ceased, the pressure in the working chamber 54 of the servo-motor 39 will be so high that it balances the pressure which come directly from the hydraulic system in the working chamber 55, and the piston 53 will thereby be in equilibrium and remain stationary. When the pressure fluid, such as oil in the working chamber 54, acts against a considerably greater surface of the piston 53 than the hydraulic fluid in the working chamber 55 to bring piston 53 into equilibrium, the pressure in the working chamber 54 must be lower than that in the working chamber 55. This lower pressure in the working chamber 54 is obtained in that the hydraulic fluid in the recess 69 (which via the ring-shaped groove 61, the recess 66 and the pipe 37 is in connection with the working chamber 54) is connected with an accurately set oil pressure in the ring-shaped grooves 74 and 75 across the edges 70 and 71. As the ring-shaped groove 74, via recess 65, ring-shaped groove 60 and pipe 63 is connected with the pressure side of the hydraulic system, the pressure in this ring-shaped groove 74 will correspond to full pressure in the hydraulic system. Similarly, the ring-shaped groove 75 is connected with the outlet side of the hydraulic system, via the recess 67, the ring-shaped groove 62 and the pipe 64, and the pressure in the ring-shaped groove 75 will therefore correspond to zero pressure of the hydraulic system. The pressure in the recess 69 and, accordingly, also in the working chamber 54, through the drop in pressure across the edges 70 and 71 is now somewhere between the full pressure of the hydraulic system (in pipe 63) and the zero pressure of the hydraulic system (in pipe 64). The absolute value of the pressure in the working chamber 54, of course, depends upon the size of the drop in pressure across the edges 70 and 71 or, in other words, it depends upon the position of the valve body 58 in relation to the valve sleeve 57.

Figure 5:
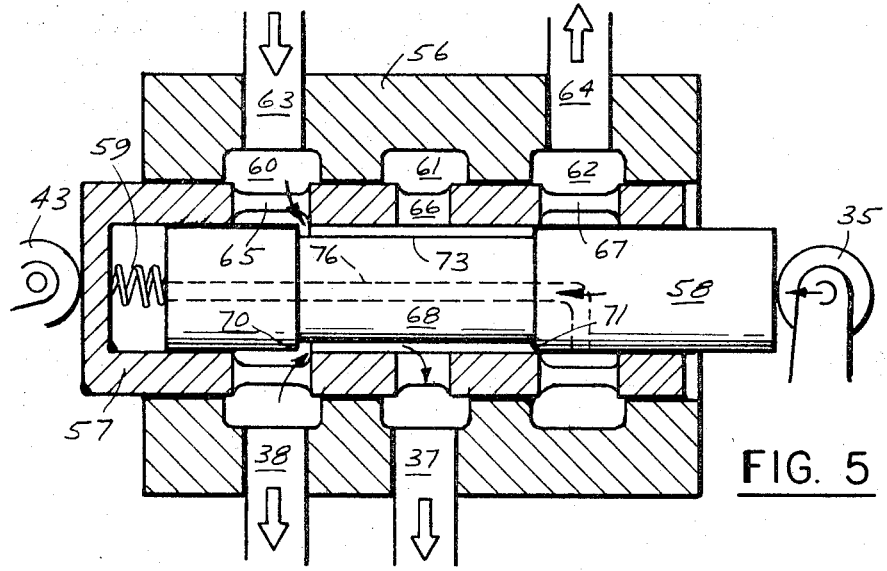
FIGS. 5 and 6 show, on a larger scale, different positions of the control valve which directs the continuously variable gear shown in FIG. 4.
Figure 6:
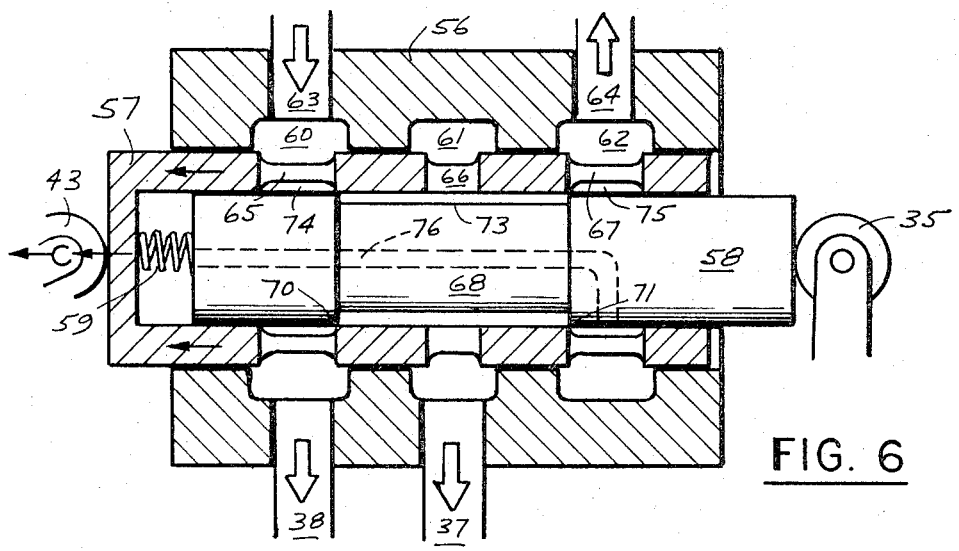

The functions which take place at the regulating valve 36 when an impulse is sent from the control member 27 are shown in FIGS. 5 and 6. In FIG. 5, it is assumed that the control impulse from the control member 27 has the effect that the guide roller 35 obtains a movement towards the valve body 58 (as indicated by an arrow in FIG. 5). The valve body 58 will be displaced in the direction also indicated by the arrow, and the helical spring 59 will be compressed. At the same time, the oil flow over the edge 70 increases, and the flow across the edge 71 will decrease. As a result, the pressure in the recess 69, the recess 66 and the ring-shaped groove 61 increases, and this increase in pressure is transmitted via the pipe 37 to the working chamber 54 of the servo-motor 39. This increase in pressure in the working chamber 54 has the result that the piston 53 is displaced in a direction away from said working chamber, and such displacement is transmitted to the member 51 via piston rod 52. Due to the turning of the member 51, the control impulse sent from the control member 27 causes an output movement of the shaft 22 from the gear motor part 23B. At the same time as the member 51 is turned counterclockwise, a corresponding turning of the lever 40 occurs, and such turning of the lever 40 is transmitted via link 41 and two-armed lever 42 to guide roller 43 which is given a movement in a direction away from the closed end of the valve sleeve 57, in the way indicated with an arrow in FIG. 6. Due to this movement of the guide roller 43, the valve sleeve, under the influence of the compressed helical spring 59, is displaced in the same direction as guide roller 43. When the movement of the valve sleeve 57 is the same as the displacement of the valve body 58 due to the action of the guide roller 35 (see FIG. 5), the decrease in pressure across the edges 70 and 71 again balances in such a way that the pressure in the chamber 69 and, accordingly, also in the working chamber 54 again have the value at which the piston 53 is in equilibrium. The final result of the control impulse sent from the control member 27 is therefore that a control impulse corresponding to the displacement of the piston 53 is produced, and at the same time the member 51 is so turned that the output speed desired for shaft 22 is obtained.

In FIG. 7, an alternative structure of the gearing 31 in the control device is shown. A movement originating at a rod 77 is transmitted via a flexible fastening member 78 to a control disc 79 which is displaceable in the two grooved bars 80. The control disc 79 includes a curved guide groove 81 in which is guided a pin 82 fastened to one end of a two-armed lever 83. At the other end of the lever, a link 84 is flexibly fastened. By means of an appropriate configuration of guide groove 81, a ratio of the same kind as the one shown in the device according to FIG. 3 may be obtained.

Figure 9:
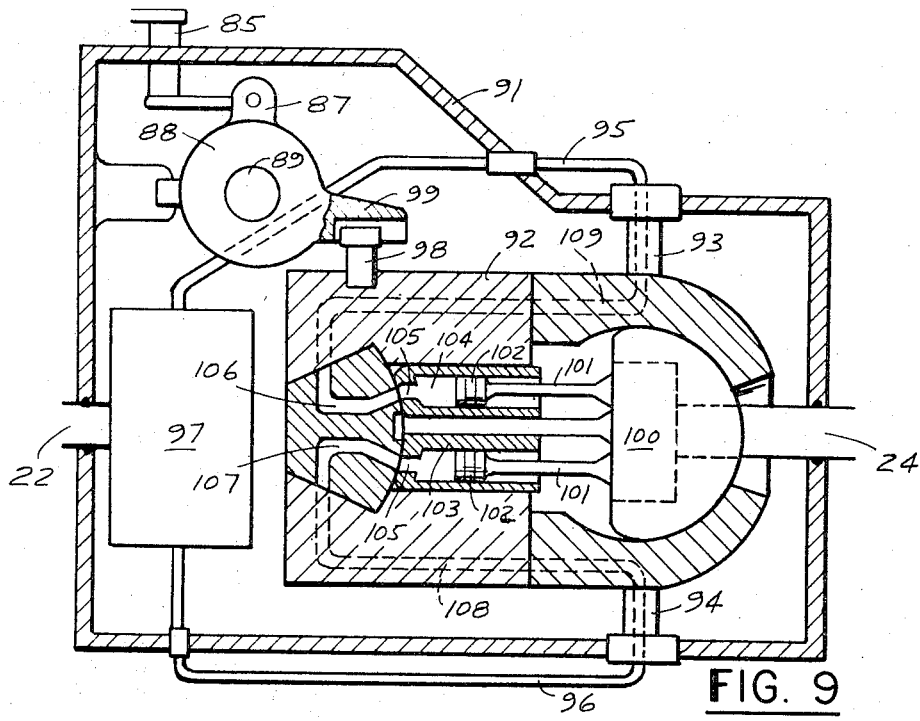
Figure 10:
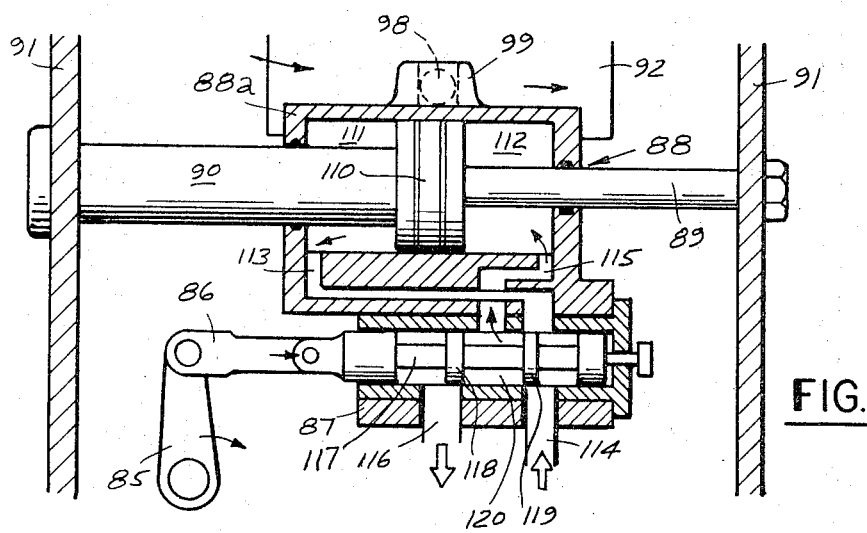

A hydrostatic gear, the pump part of which has a structure different from the one previously described, is shown in FIGS. 8 to 10, which also show the servo-motor with its valve, required for the control. The pump part has a rotatable pump housing 92, in the way described on, for example, page 84 of "Öl Hydraulik" by H. Zoebel, Vienna, 1963. The pump housing 92 is rotatable about a shaft which extends through journals 93 and 94. The rotatable pump housing 92 is controlled by a servo-motor 88 which can be displaced along two piston rods 89 and 90. The rods, in turn, are fixed in the casing 91 which surrounds the hydrostatic gear. The control of the servo-motor 88 is obtained by a valve 87 which is fixed to the servo-motor housing.

As shown in FIG. 8, the control member 27 is connected via shaft 28, gearing 31, lever 32 and link 33 to a two-armed lever 85. This lever, in turn, actuates a valve 87 which can be displaced in a valve body 117 (FIG. 10) arranged in a valve 87, via a link 86. Due to the action of valve 87, the housing 88a of servo-motor 88 can be displaced in one direction or the other along the piston rods 89 and 90. A boss 99 on the servo piston motor actuates a guide journal 98 arranged in a groove in said boss, which in turn regulates the turning of pump housing 92. The oil which is fed from the pump housing 92 of the hydrostatic gear will be transmitted through pipes 95 and 96 through journals 93 and 94 to the hydraulic motor 97 of the gear. Hence, the movement transmitted to the gear through input shaft 24 is transmitted, in the same manner as previously described for hydrostatic gear 23 when the pump part 92 is deflected, to output shaft 22.

As can best be seen from FIG. 9, the input shaft 24 of the gear is fixed to a disc 100 including holes so that piston rods 101 can flexibly follow disc 100 in its rotation together with shaft 24. Pistons 102 on piston rods 101 are located in cylinders 104 in a cylinder block 103. The cylinders 104 are connected through channels 105 with pipes 106, 107, 108 and 109 arranged in the pump housing and these pipes are, in turn, connected with the pipes 95 and 96.

When the pump housing 92 is turned, the input shaft 24 and the disc 100 will remain in their original positions, while piston rods 101 with their pistons 102 and cylinder block 103 will follow along at the turning. This has the result that when the pump housing 92 is turned, in a known way, hydraulic fluid will be pumped through pipes 95 and 96 and hydraulic motor part 97 of the gear. This hydraulic motor part 97 may be arranged in the same way as for the previously described gear, that is, for instance, as shown on page 208 of Ahrendt's "Servo-Mechanism Practice."

The functioning of the control valve 87 and the servo piston motor 88 is shown in FIG. 10. The servo piston motor 88, as previously described, can be displaced along piston rods 89 and 90, which, inturn, are fixed to the housing 91 surrounding the gear. A piston 110 inside the valve housing of the servo piston motor divides the valve housing into working chambers 111 and 112. From the working chamber 111 a pipe 113 leads to a pressure pipe 114 of the hydraulic system. Similarly, working chamber 112 is connected via a pipe 115 to a chamber 120 which, in the rest position of the valve body 117, is limited by guide cams 118 and 119. The guide cams 118 and 119 control the connection from chamber 120 to pressure pipe 114 of the hydraulic system and also to an outlet pipe 116 of the hydraulic system.

Regulating valve 87 and servo piston motor 88 function as follows:

When a movement is fed to valve body 117 via lever 85 and link 86 in the direction shown with arrows in FIG. 10, the pressure in pressure pipe 114, due to the displacement of guide cam 119, is transmitted to chamber 120, and from there via pipe 115 to working chamber 112. Since this working chamber has a considerably larger free surface facing piston 110 than the working chamber 111, the entire servo-motor housing 88 is displaced in the direction indicated by arrows in FIG. 10. The valve housing 87 is also displaced in the same direction, and this displacement continues until guide cams 118 and 119 reach positions such that the pressure in the working chamber 12 balances the presure in the working chamber 111. In other words, since the regulating valve 87 is displaced at the same time as the servo-motor housing 88, an automatic recuperation will take place. The displacement of servo-motor housing 88 is transmitted to pump housing 92, in the way indicated above, via boss 99 and guide journal 98. As final result, the turning of the lever 85 which takes place causes a turning of the pump housing 92, and an output movement of the shaft 22 is thus obtained.

Gears 12 and 13, arranged immediately inside the driving wheels 4 and 5 may be made in the form of planetary gears, and a suitable structure is shown in FIG. 11. The shaft 11, which is common for the two driving wheels, is provided with a gear 121 in each end of the gearings. Gear 121 engages the outer gear arc 123 in the gear ring 122. The gear ring 122 has an inner gear arc 124 engaged by two planetary gears 125 and 126 rotatably supported on a planetary gear holder 127 which via a shaft 128 is connected with driving wheel 4. Between the planetary gears 125 and 126, a sun gear 129 is arranged which by means of a shaft 130 is connected with a bevel gear 131 supported on the previously mentioned shaft 15.

The device for steering track-laying vehicles according to the present invention functions in the following way:

When the control member 27 is in the neutral position, the continuously variable pump part 23A of the gear is also in the neutral position, that is, the output shaft 22 remains stationary. As a result, shafts 15 and 16 are also stationary, and the entire movement of the driving wheels 4 and 5 is thus controlled only by the movement fed to the common shaft 11 whereby the two driving wheels have the same speed and the track-laying will move straight ahead.

When the control member 27 is turned, such turning, in the way described above, via the system 28, 29, 30, 31, 33, 34 and 35 is transmitted to the valve body 58 of the valve 36. This, in turn, causes piston 53 in servo-motor 39 to move, and via piston 52 to actuate the tiltable member 51 of the gear pump part 23A. The turning of member 51, via the system 40, 41, 42 and 43 is transmitted to the valve sleeve 57 in such a way that the movement of the piston 53 ceases. In other words, the control impulse from the control member 27 results in a movement of piston 53, corresponding to the control impulse, which movement will turn member 51 in such a way that a speed of the output shaft 22 from the gear motor part 23B, corresponding to the control impulse from the control member 27, will be obtained. This movement of the shaft 22 is transmitted via double bevel gear 21 and two shafts 19 and 20 to bevel gears 17 and 18, and via the shafts 15 and 16 imparts a further input movement to gears 12 and 13, in addition to the movement normally imparted via the shaft 11.

When the control member 27 is turned in the direction which initiates steering of the track-laying vehicle to the right (in the travelling direction), the movement of shaft 22 which is derived from gear 23 has a direction such that said movement, after the one transmitted to the gear 12 via the double bevel gear 21, the shaft 20, the bevel gear 17 and the shaft 15 has been fed to the gear 12, results in a decreased output movement of the shaft 128 to the gear wheel 4, in relation to the movement fed only from the shaft 11.

As may be noted from FIG. 11, the movement from the shaft 11 via gear wheel 121 and outer gear arc 123 is transmitted to gear ring 122. Due to the movement transmitted from shaft 15 via bevel gear 131 and shaft 130, the sun wheel 129 obtains a movement in the opposite direction in relation to the movement obtained by the shaft 11 of the gear ring 122. As a result, the two planetary gear wheels 125 and 126 have a lower speed than if the sun wheel 129 had remained stationary, and the movement fed through the shaft 15 therefore has the result that the movement transmitted to the driving wheel 4 by means of the planetary holder 127 and the shaft 128 is reduced. Similarly, the output movement from the shaft 22, via double bevel gear 21, shaft 19, bevel gear 18 and shaft 16 imparts to gear 13 an additional movement such that the driving wheel 5 obtains a more rapid movement than it would have obtained from shaft 11 only. In other words, the output movement from the shaft 22 from the gear motor part 23B overrides in the gears 12 and 13 in such a way that the output movement from the shaft 11 is given a reduced speed at the driving wheel 4, and an increased speed at the driving wheel 5. As a result of such overriding, the track-laying vehicle will be turned towards the right as it is desired by turning the control member 27.

However, it is not necessary that the gears 12 and 13, when the track-laying vehicle is turned, obtain any movement from the shaft 11, as such turning movement can also be obtained without the cooperation of the movement of shaft 11. The output movement from gear 23 is then the only movement which is fed to the driving wheels 4 and 5, and these driving wheels will thereby have the same speed, but in the opposite direction. Accordingly, with the steering device according to the present application, a turning can also be obtained for a stationary vehicle, even if the brakes 14 thereof are on. The fact that this is possible is, of course, of great importance for combat vehicles of the above-mentioned kind, where are armament is aimed in traverse by turning the entire vehicle. In this way, it is possible, for instance, to track a target without having to move the vehicle noticeably in its longitudinal direction.

As mentioned above, when turning the control member within the range nearest the neutral position of the control member, the output steering effect will be considerably less than when a corresponding turning takes place within a range at a longer distance from the neutral position of the control member. This permits aiming of the vehicle, with extremely great precision, that is, for the final aiming of armament fixed in the vehicle. At the same time, with the same control member, it is possible, by means of greater turning of the joystick, to obtain a considerably greater output steering and thereby relatively rapid and larger changes in the course of the vehicle.

As will be noted from the above, the steering device according to the application has the advantage that it provides very good precision with regard to the turning of the track-laying vehicle, and at the same time a rapid change of course. The device will, moreover, withstand heavy wear and, consequently, is very sturdy and has a long useful life.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A device for directional control of a track-laying vehicle, said device comprises two drive wheels for driving the tracks of the vehicle, power driven first transmission means for transmitting a driving force to said wheels, said first transmission means including transmission elements drivingly coupled with said wheels, and control means connected with said transmission elements for imparting to the same a driving force superimposed upon the driving force imparted to said wheels by said first transmission means, said superimposed driving force varying the rotational speed imparted to the wheels in accordance with the magnitude and the direction of the superimposed force, said control means comprising a movable control member, and second transmission means having a variable transmission ratio, said second transmission means connecting said control member to the first mentioned transmission means for imparting the driving force to said driving wheels, the transmission ratio of said second transmission means being controlled by the position of the control member in reference to a neutral position, means operatively connected to said movable control member and second transmission means so as to produce a rate of increase of the transmission ratio of the second transmission means for any given increment of the control member movement increasing with increasing departure of the control member from said neutral position.

2. A device according to claim 1, wherein said control means comprise a linkage means and bevel gear means actuable by said linkage means, said bevel gear means coacting with said transmission element for superimposing upon said one driving wheel an increased rotational speed and superimposing upon the other driving wheel a decreased rotational speed.

3. A device according to claim 1, wherein said control means comprises a hydrostatic means including a pump and a tiltable member, the position of the tiltable member controlling the output of said pump and thus the output of the hydrostatic means, and a servomotor means including a piston and a control member controlling the position of the piston, said piston position controlling the position of the tilt of said tiltable member.

4. A device according to claim 3, wherein said servomotor means comprise a cylinder, said piston dividing said cylinder into two working chambers, the sides of said piston facing said working chambers with surfaces of different areas; and further comprising a hydraulic pressure means having a pressure side and an outlet side, conduit means continuously connecting the pressure side of said pressure means with the chamber facing the piston side having the smaller surface area, and pressure regulating means connected to the other working chamber for regulating the pressure therein so that the differential pressure between said chambers biases the piston into a position corresponding to the position of said control member.

5. A device according to claim 4, wherein said pressure regulating means comprise a valve means including a generally cylindrical valve housing, a valve sleeve displaceable in said housing and a valve body displaceable in said sleeve, said valve housing having in its inner wall the circumferential grooves, the intermediate one of said grooves being connected with said other working chamber, one of the outer grooves being connected with the pressure side of said pressure means and the other outer groove with the outlet side of said pressure means, said valve sleeve including three recesses coacting with said grooves and said valve body including a lengthwise extending recess having a length corresponding approximately to the spacing between the two outer recesses in the valve sleeve, a control element controlled by said control member and controlling the lengthwise position of the valve body in the valve sleeve, and a second control element controlled by the pump of said hydraulic means and controlling the lengthwise position of the valve sleeve in the valve housing, the positions of the piston of the servomotor means and of the valve sleeve being balanced by the coaction of said recesses and said grooves in a manner such that when the control member is in a neutral position the working chamber facing the piston side having the larger surface area is at a pressure at which said piston is in equilibrium thereby remaining at rest.

6. A device according to claim 1, wherein said second transmission means comprises linkage means coupled with said first transmission means to actuate the same by displacement of said control member, said linkage elements including several elements movable relative to each other, a movable guide member including a curved guide track and a member guided in said track, one of said members being coupled to said control member and the other to said linkage means, the curvature of said guide track being such that the rate of the relative displacement of the elements of the linkage means for any given increment of the control member movement increases with increasing displacement of the control member from said neutral position thereof.

References Cited
UNITED STATES PATENTS

| | | | |
|---|---|---|---|
| 1,984,830 | 12/1934 | Higley | 74—720.5 X |
| 1,991,094 | 2/1935 | Higley | 74—720.5 X |
| 2,091,356 | 8/1937 | Fawcett | 74—675 X |
| 2,336,912 | 12/1943 | Zimmermann | 74—720.5 X |
| 2,385,881 | 10/1945 | Peterson | 74—497 |
| 2,560,554 | 7/1951 | Colby | 74—720.5 X |
| 2,874,591 | 2/1959 | Thoma | 74—687 X |
| 3,225,618 | 12/1965 | Page | 74—472 X |

FOREIGN PATENTS

| | | |
|---|---|---|
| 714,061 | 10/1941 | Germany. |
| 410,525 | 4/1945 | Italy. |

DONLEY J. STOCKING, *Primary Examiner.*

DAVID J. WILLIAMOWSKY, *Examiner.*

J. R. BENEFIEL, *Assistant Examiner.*